United States Patent [19]
Miller

[11] Patent Number: 4,796,917
[45] Date of Patent: Jan. 10, 1989

[54] PASSIVE SEAT BELT SYSTEM

[75] Inventor: Larry D. Miller, Rochester, Mich.

[73] Assignee: General Motors Corporation, Detroit, Mich.

[21] Appl. No.: 97,725

[22] Filed: Sep. 17, 1987

[51] Int. Cl.⁴ .............................................. B60R 22/06
[52] U.S. Cl. .................................. 280/804; 280/801; 297/469
[58] Field of Search .............. 280/801, 802, 804, 808; 297/469, 474, 485

[56] References Cited

U.S. PATENT DOCUMENTS

| | | | |
|---|---|---|---|
| 4,218,075 | 8/1980 | Rogers, Jr. | 280/804 |
| 4,234,210 | 11/1980 | McNally et al. | 280/804 |
| 4,272,105 | 6/1981 | Holka et al. | 280/804 |

Primary Examiner—Richard A. Bertsch
Attorney, Agent, or Firm—Charles E. Leahy

[57] ABSTRACT

According to the invention, the roof rail mounted track for a shoulder belt carriage extends down along the windshield pillar. A belt supporting hook is pivotally mounted on the body at the juncture between the roof rail and the windshield pillar and has a spring means acting to urge the hook to a normal position extending into the path of movement of the carriage along the track. The spring yields upon engagement of the carriage with the hook to temporarily pivot the hook away from the belt to permit movement of the carriage past the hook. Then, the spring returns the hook into the path of movement so that the hook supports the belt at the juncture of the roof rail and the windshield pillar during the further forward and downward movement of the carriage along the track. In addition, a belt support is fixedly mounted on the pillar and surrounds the track in spaced apart relation therefrom to permit the carriage to move through the support during such forward movement thereof so that the shoulder belt is deflected by the belt loop to lift the lap belt and the shoulder belt higher and higher while the carriage proceeds forwardly and downwardly along the pillar.

5 Claims, 2 Drawing Sheets

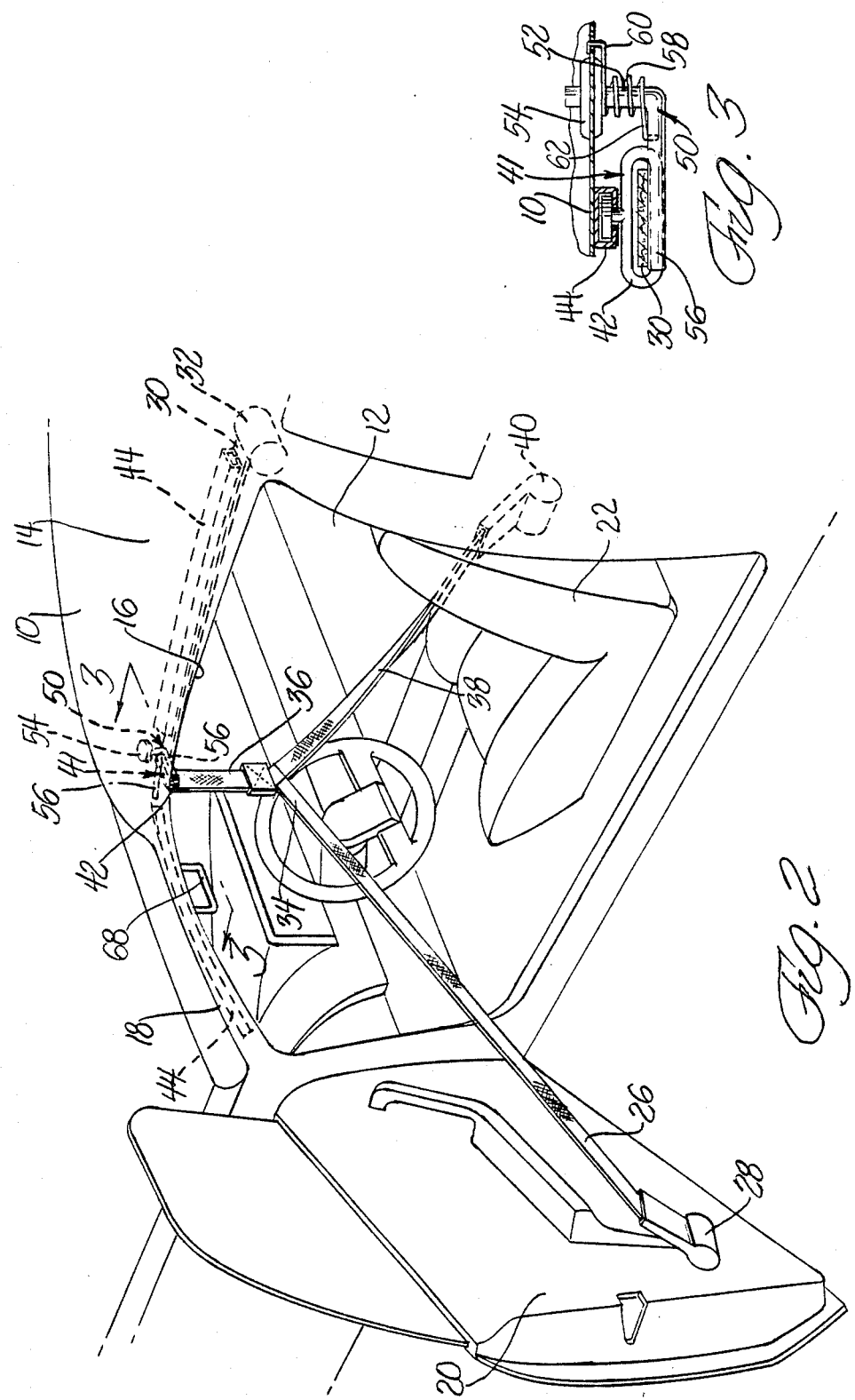

PASSIVE SEAT BELT SYSTEM

The invention relates to a passive lap and shoulder belt system and more particularly provides improvements in a roof rail mounted track and carriage which facilitate occupant ingress and egress by moving the lap and shoulder belts further forwardly and upwardly away from the seated occupant.

BACKGROUND OF THE INVENTION

It is well known in seat belt art to provide a lap and shoulder belt system which is automatically moved between an occupant restraining position and occupant access position in response to movement of the door. In such systems the outboard end of the lap belt is connected to the door so that the outward swinging movement of the door will move the outboard lap belt end away from the occupant. The shoulder belt is mounted on either the roof rail or the B pillar and is surrounded by a carriage movable along a roof rail mounted track to stow the shoulder belt along the roof rail, thereby moving the shoulder belt upwardly and forwardly to clear the door opening for occupant ingress and egress. The inboard ends of the lap and shoulder belts are connected together by a control belt which is retractably mounted inboard the seat to pull the inboard lap and shoulder belt ends around the occupant when the door is closed and the carriage is moved rearwardly along the track.

The present invention relates to improvements in the aforedescribed three point passive belt system which enable the lap and shoulder belts to be moved further forwardly and upwardly away from the occupant to thereby further improve occupant ingress and egress.

SUMMARY OF THE INVENTION

According to the present invention, the roof rail mounted track extends further forwardly and downwardly along the windshield pillar. A belt supporting hook is pivotally mounted on the body at the juncture between the roof rail and the windshield pillar and has a spring acting to urge the hook to a normal position extending into the path of movement of the carriage along the track. The spring yields upon engagement of the carriage with the hook to temporarily pivot the hook away from the belt to permit movement of the carriage past the hook. Then, the spring returns the hook into the path of movement so that the hook supports the belt at the juncture of the roof rail and the windshield pillar during the further forward and downward movement of the carriage along the track. In addition, a belt support is mounted on the pillar and surrounds the track in spaced apart relation therefrom to permit the carriage to move through the support during forward carriage movement so that the shoulder belt is deflected by the belt support to lift the juncture of the lap and shoulder belts higher and higher while the carriage proceeds forwardly and downwardly along the pillar.

BRIEF DESCRIPTION OF THE DRAWINGS

These and other objects, features and advantages will become apparent upon consideration of the description of the preferred embodiment and the appended drawings in which:

FIG. 2 is a view similar to FIG. 1 but showing the belt system at an intermediate position between the occupant restraining position and occupant access position;

FIG. 3 is a sectional view taken in direction of arrows 3—3 of FIG. 1 and shows the spring biased hook acting to support the shoulder belt in the raised position facilitating occupant ingress and egress.

DESCRIPTION OF THE PREFERRED EMBODIMENT

Figure 1:
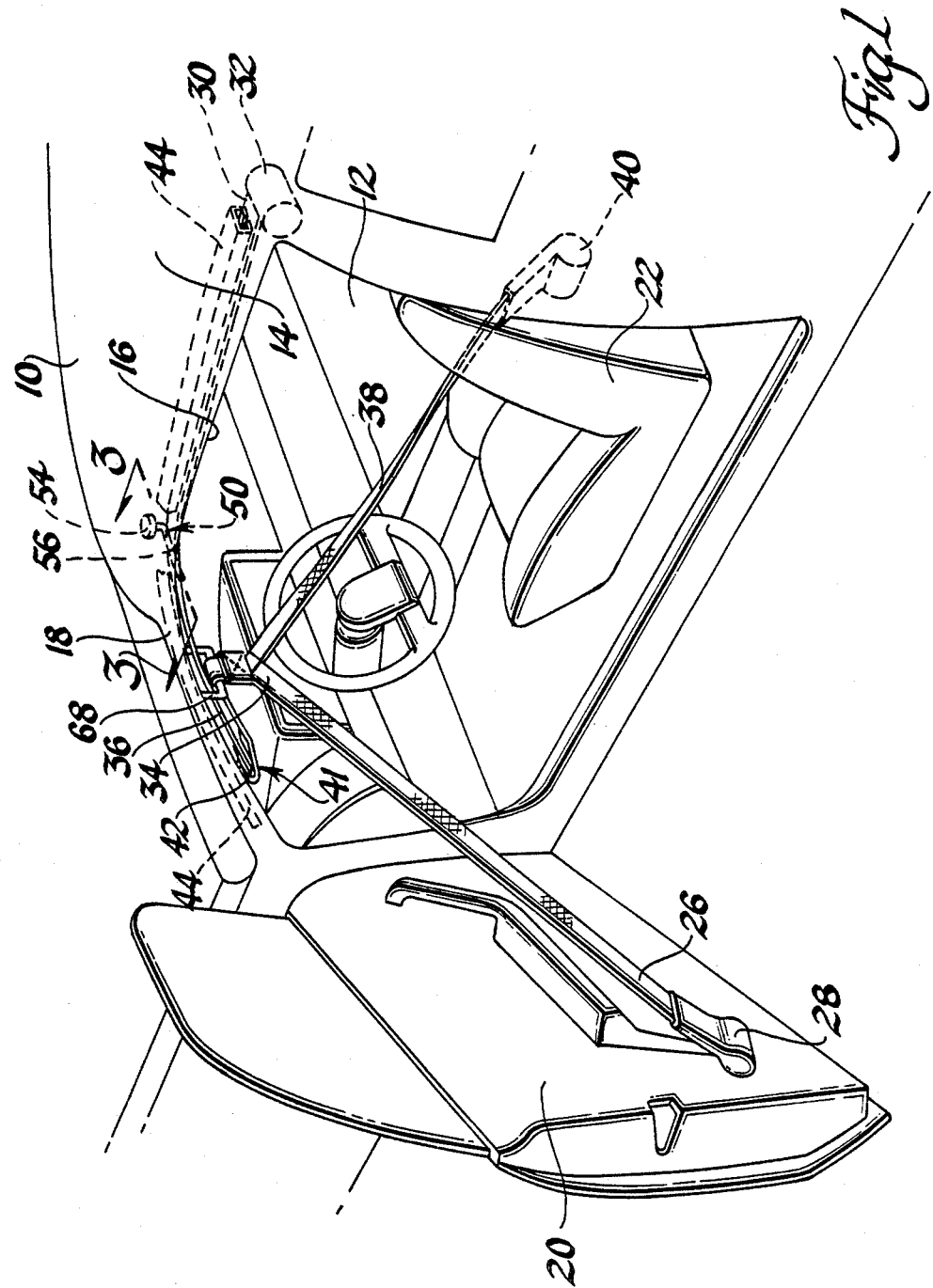
FIG. 1 is a perspective view of a vehicle body having a passive seat belt system according to the invention and shown with the lap and shoulder belts moved fully forward to their occupant ingress and egress facilitating position.

Referring to FIG. 1, there is shown a vehicle body 10 having a passenger compartment 12 defined by a roof 14 having a roof rail 16 and a windshield pillar 18. The roof rail 16 and windshield pillar 18 cooperate to define a door opening which is opened and closed by a door 20 hingedly mounted on the vehicle body. An occupant seat 22 is situated within the occupant compartment 12 for seating an occupant.

A passive seat belt system for restraining the occupant in the seat 22 includes a lap belt 26 mounted on the lower rear corner of the door by a lap belt retractor 28. The seat belt system also includes a shoulder belt 30 mounted on the body 10 by a shoulder belt retractor 32. The lap belt 26 has an inboard end 34 and the shoulder belt 30 has an inboard end 36 which are joined together and connected to a control belt 38. The control belt is mounted on the vehicle body inboard the seat 22 by a retractor 40.

FIG. 1 shows the belt system moved to permit occupant ingress and egress from the seat. The retractors 28, 32, and 40 cooperate with one another to exert tension on the lap belt 26 and shoulder belt 30 to occupant restraining positions about the occupant. In particular, when the door is closed the retractor 28 winds up the outboard end of the lap belt 26, the retractor 40 winds up the control belt 38, and the shoulder belt retractor 32 winds up the shoulder belt 30. The control belt retractor 40 has a windup force greater than the lap belt retractor 28 or the shoulder belt retractor 32 so that the juncture of the inboard end 34 of lap belt 26 and inboard end 36 of the shoulder belt 30 are pulled adjacent the occupant inboard hip.

As best seen in FIGS. 2 and 3, the shoulder belt is moved fore and aft along the roof rail 16 by belt carriage 41 which includes a belt loop 42 slidably encircling the shoulder belt 30. The carriage 41 is mounted on the roof rail 16 by a track 44 which extends longitudinally from the shoulder belt retractor 32 and also extends angularly downwardly along the windshield pillar 18. A tape drive, or a push pull cable, or some other suitable drive device, is energized by a motor, not shown, to move the carriage 41 fore and aft along the track 42.

When the carriage 41 is positioned at its full rearward position adjacent the shoulder belt retractor 32, the shoulder belt 30 is permitted to hang vertically downward across the occupant's upper torso so restrain the occupant. As the carriage 40 is moved forwardly along the track, as shown in FIG. 2, the shoulder belt 30 is stored along the roof rail 16 to move the shoulder belt away from the seated occupant and lift the juncture of the lap belt 26 and the control belt 38 upwardly and forwardly away from the seated occupant.

As best seen in FIGS. 2 and 3, a shoulder belt supporting hook 50 is mounted on the body 10 at the juncture of the roof rail 16 and the windshield pillar 18. Hook 50 includes a shaft 52 pivotally mounted in a pivot bushing 54 and having a lateral arm 56 which extends into the path of movement of the carriage 41. A spring 58 encircles the shaft 52 and has an arm 60 anchored on a vehicle body 10 and an arm 62 engaging the lateral arm 56. The spring 58 normally establishes the hook 50 at its position of FIG. 3 in which the lateral arm 56 is positioned in the path of movement of the carriage 41.

As best seen in FIG. 2, forward movement of the carriage 41 causes the carriage to strike the lateral arm 56 of hook 50 and rotate the hook forwardly to permit the carriage to pass further forward along the track 44. As soon as the carriage passes the hook, the spring 58 pivots the hook 50 back to its normal position so that the lateral arm 56 rests beneath the shoulder belt 30 as shown in FIG. 3 to support the shoulder belt 30 in close proximity with the roof 14 even though the carriage 41 begins to descend along the windshield pillar 18.

As best seen in FIGS. 1 and 2, a U-shaped support 68 depends from the windshield pillar 18 and straddles the track 44 and the carriage 41. Accordingly, as best seen in FIG. 1, the further forward movement of the carriage 41 forwardly and downwardly along the windshield pillar 18 permits the carriage 41 to pass through the support 68 so that the shoulder belt 30 doubles back from the carriage and is deflected downwardly over the supports 68. Thus, the lap belt 26 and the control lap 38 are not pulled further forward, as might interfere with the steering wheel, but instead, are lifted further upwardly to further facilitate occupant ingress and egress. As seen in FIG. 1, were it not for the support 68 deflecting the belt, the downward movement of the carriage 41 along the pillar would position the lap belt 26 and control belt 38 at lower positions than the position resulting with the support 68 as shown in FIG. 1. The location of the support 68 is chosen to provide optimum belt lifting trajectory as desired to avoid interference with the steering wheel and yet position the belt as far as possible away from the occupant.

With respect to the three retractors shown in FIG. 1, it will be understood that the functioning of such a three retractor system requires that the retractors have locking mechanisms associated therewith, such as vehicle sensitive inertia locking systems. Furthermore, the control belt retractor 40 has a stronger windup spring than the lap belt retractor or the shoulder belt retractor so that the juncture of the lap and shoulders belts will always be drawn to the proper position relative the occupant inboard hip. Alternatively, the control belt retractor 40 may have an electric windup motor such as that shown in U.S. Pat. No. 4,211,430 by Richard Fancy.

In addition, it will be understood that the preferred functioning of the system requires that the shoulder belt 30 not be excessively unwound from the retractor 32 during the forward movement of the carriage 41 along the track 44. Accordingly, the retractor 32 may have only a limited belt winding capacity, for example, twelve inches of belt which would be sufficient to permit the restrained occupant to lean forward to reach the driver controls, but would assure that the forward carriage movement would lift the belts away from the occupant. Alternatively, the retractor 32 could have a latch mechanism therein, such as that shown in U.S. Pat. No. 4,218,076 by Edward Compeau, which would lock the retractor against belt unwinding while the carriage is being driven forward.

Thus it is seen that the pivoting hook 50 and the support 68 of this invention enhance the occupant ingress and egress by permitting the lap belt and the control belt to be positioned further forwardly and upwardly with respect to the seat than would otherwise be attained. It should be appreciated that the pivoting hook 50 and the support 68 are not limited in their use for the particular seat belt system shown in the drawings, but may have a more general usefulness in seat belt systems having a roof mounted track.

For example, the shoulder belt 30 may be fixedly attached to the vehicle body instead of fixed by a retractor 32. Likewise, the outboard end of the lap belt 26 may be fixedly attached to the lower rear corner of the door instead of being mounted by a retractor as shown in FIG. 1. Reference may be had to U.S. Pat. No. 4,253,681 by Ronald Barnet, for an example of such a belt system.

Furthermore, it will be understood that the hook 50 and support 68 of this invention may be useful in two-point passive belt systems, that is, a system having only a shoulder belt.

In addition, the support 68 may be useful in belt systems of the type in which the outboard shoulder belt end is fixedly mounted on the carriage instead of being mounted by a retractor.

Thus it is understood that the invention is not limited to the exact construction illustrated and described above, but that various changes and modifications may be made without departing from the spirit and scope of the invention as defined in the appended claims.

The embodiments of the invention in which an exclusive property or privilege is claimed are defined as follows:

1. In a vehicle having a roof including a roof rail and a windshield pillar, and a passive seat belt system in which the occupant is restrained by a shoulder belt movable along the roof rail by a carriage movable along a track to move the shoulder belt away from the occupant to permit ingress and egress, the improvement comprising;
   said track extending further forwardly and downwardly along the windshield pillar to move the shoulder belt further forwardly;
   and a belt support fixedly mounted on the roof and surrounding the track in spaced relation therefrom to permit the carriage to move through the support during said forward movement thereof whereby the further forward movement of the carriage after the carriage passes through the support causes the shoulder belt to be doubled back from the carriage and deflected by the belt support to lift the shoulder belt higher while the carriage proceeds forwardly and downwardly along the pillar.

2. In a vehicle having a roof including a roof rail and a windshield pillar, and a passive seat belt system in which the occupant is restrained by a shoulder belt movable along the roof rail by a carriage movable along a track to move the shoulder belt away from the occupant to permit ingress and egress, the improvement comprising;
   said track extending further forwardly and downwardly along the windshield pillar to move the shoulder belt further forwardly;

a belt supporting hook pivotally mounted on the body at the juncture between the roof rail and the windshield pillar;

spring means acting on the hook to urge the hook to a normal position extending into the path of movement of the carriage along the track, said spring yielding upon engagement of the carriage with the hook to temporarily pivot the hook away from the belt during movement of the carriage past the hook and then return the hook into the path of movement so that the hook supports the belt at the juncture of the roof rail and windshield pillar during the further forward and downward movement of the carriage along the track.

3. In a vehicle having a roof including a roof rail and a windshield pillar, a passive seat belt system including a lap belt having an outboard end mounted on the door, a shoulder belt having an outboard end mounted on the body, a control belt having an inboard end mounted on the body inboard the seat and having an outboard end connected to the inboard ends of the lap and shoulder belts, retractor means associated with at least one of the belts to draw the lap and shoulder belts to restraining positions about a seated occupant, and a track mounted carriage slidably engaging the shoulder belt and movable forwardly along a roof mounted track upon door opening movement to move the shoulder belt forwardly and thereby move the lap belt forwardly and upwardly away from the seat to permit occupant ingress and egress, the improvement comprising:

said track extending further forwardly and downwardly along the windshield pillar to move the lap and shoulder belts further forwardly;

and a belt support mounted on the pillar and surrounding the track to permit the carriage to move through the support during said forward movement thereof whereby the further forward movement of the carriage after the carriage passes through the support causes the shoulder belt to be deflected by the belt support to lift the inboard ends of the lap belt and the belt shoulder belt higher while the carriage proceeds forwardly and downwardly along the pillar.

4. In a vehicle having a roof including a roof rail and a windshield pillar, and a passive seat belt system including a lap belt having an outboard end mounted on the door, a shoulder belt having an outboard end mounted on the body, a control belt having an inboard end mounted on the body inboard the seat and having an outboard end connected to the inboard ends of the lap and shoulder belts, retractor means associated with at least one of the belts to draw the lap and shoulder belts to restraining positions about a seated occupant, and a track mounted carriage slidably engaging the shoulder belt and movable forwardly along a roof mounted track upon door opening movement to move the shoulder belt forwardly and thereby move the lap belt forwardly and upwardly away from the seat to permit occupant ingress and egress, the improvement comprising:

said track extending further forwardly and downwardly along the windshield pillar to move the lap and shoulder belts further forwardly;

a belt supporting hook pivotally mounted on the body at the juncture between the roof rail and the windshield pillar;

and spring means acting on the hook to urge the hook to a normal position extending into the path of movement of the carriage along the track, said spring yielding upon engagement of the carriage with the hook to temporarily pivot the hook away from the belt during movement of the carriage past the hook and then return the hook into the path of movement so that the hook supports the belt at the juncture of roof rail and windshield pillar during the further forward and downward movement of the carriage along the track.

5. In a passive seat belt system including a lap belt having an outboard end mounted on the door, a shoulder belt having an outboard end mounted on the body, a control belt having an inboard end mounted on the body inboard the seat and having an outboard end connected to the inboard ends of the lap and shoulder belts, retractor means associated with at least one of the belts to draw the lap and shoulder belts to restraining positions about a seated occupant, and a track mounted carriage slidably engaging the shoulder belt and movable forwardly along a roof mounted track upon door opening movement to move the shoulder belt forwardly and thereby move the lap belt forwardly and upwardly away from the seat to permit occupant ingress and egress, the improvement comprising:

said track extending further forwardly and downwardly along the windshield pillar to move the lap and shoulder belts further forwardly;

a belt supporting hook pivotally mounted on the body at the juncture between the roof rail and the windshield pillar;

spring means acting on the hook to urge the hook to a normal position extending into the path of movement of the carriage along the track, said spring yielding upon engagement of the carriage with the hook to temporarily pivot the hook away from the belt during movement of the carriage past the hook and then return the hook into the path of movement so that the hook supports the belt at the juncture of roof rail and windshield pillar during the further forward and downward movement of the carriage along the track;

and a belt loop mounted on the pillar and surrounding the track in spaced relation therefrom to permit the carriage to move through the loop during said forward movement thereof whereby the further forward movement of the carriage after the carriage passes through the loop causes the shoulder belt to be doubled back from the carriage and deflected by the belt loop to lift the inboard ends of the lap belt and the shoulder belt higher while the carriage proceeds forwardly and downwardly along the pillar.

* * * * *